United States Patent
Boucher

(10) Patent No.: US 6,169,901 B1
(45) Date of Patent: Jan. 2, 2001

(54) MOBILE TELEPHONE WITH INTERIAL IDENTIFIER IN LOCATION MESSAGES

(75) Inventor: Pierre-Hugues Boucher, Saint-Avertin (FR)

(73) Assignee: U.S. Philips Corporation, New York, NY (US)

( * ) Notice: Under 35 U.S.C. 154(b), the term of this patent shall be extended for 0 days.

(21) Appl. No.: 08/973,041

(22) PCT Filed: Mar. 24, 1997

(86) PCT No.: PCT/IB97/00286

§ 371 Date: Nov. 24, 1997

§ 102(e) Date: Nov. 24, 1997

(87) PCT Pub. No.: WO97/36438

PCT Pub. Date: Oct. 2, 1997

(30) Foreign Application Priority Data

Mar. 27, 1996 (FR) .................................................. 96 03825

(51) Int. Cl.[7] ...................................................... H04Q 7/22
(52) U.S. Cl. ........................ 455/456; 455/38.1; 455/411; 455/457
(58) Field of Search .................................. 455/440, 456, 455/457, 432, 435, 404, 433, 422, 436, 566, 445, 427, 458, 12.1

(56) References Cited

U.S. PATENT DOCUMENTS

| | | | |
|---|---|---|---|
| 4,723,303 | * | 2/1988 | Koch ........................................ 455/67 |
| 5,128,669 | * | 7/1992 | Dadds et al. ........................... 340/901 |
| 5,384,824 | * | 1/1995 | Alvesalo ................................. 379/59 |
| 5,797,097 | * | 8/1998 | Roach, Jr. et al. ..................... 455/456 |
| 5,950,137 | * | 9/1999 | Kim ........................................ 455/456 |
| 6,035,198 | * | 3/2000 | Wiehe .................................... 455/445 |
| 6,049,718 | * | 4/2000 | Steward ................................. 455/456 |

FOREIGN PATENT DOCUMENTS

0699009A1 * 8/1994 (EP) ................................ H04Q/7/22

OTHER PUBLICATIONS

Wireless Networks, vol. 1, No. 1, pp. 83–93, Rao S et al : "Interworking Between Digital European Cordless telecommunication and a Distributed Packet Switch" Feb. 1995.*

"Interworking between Digital European Cordless Telecommunications and a distributed packet switch", by Rao et al, Wireless Networks, vol. 1, No. 1, Feb. 1995, pp. 83–93.

* cited by examiner

*Primary Examiner*—Daniel S. Hunter
*Assistant Examiner*—Pablo N. Tran
(74) *Attorney, Agent, or Firm*—Dicran Halajian

(57) ABSTRACT

A telecommunications system includes a base station and a mobile terminal having an internal identifier. Location messages are exchanged between the base station and mobile terminal to provide location of the mobile terminal to the base station. The location messages include a locate request message transmitted from the mobile terminal to the base station and a locate accept message transmitted from the base station to the mobile terminal. The internal identifier is transported by the locate request message and the locate accept message.

12 Claims, 1 Drawing Sheet

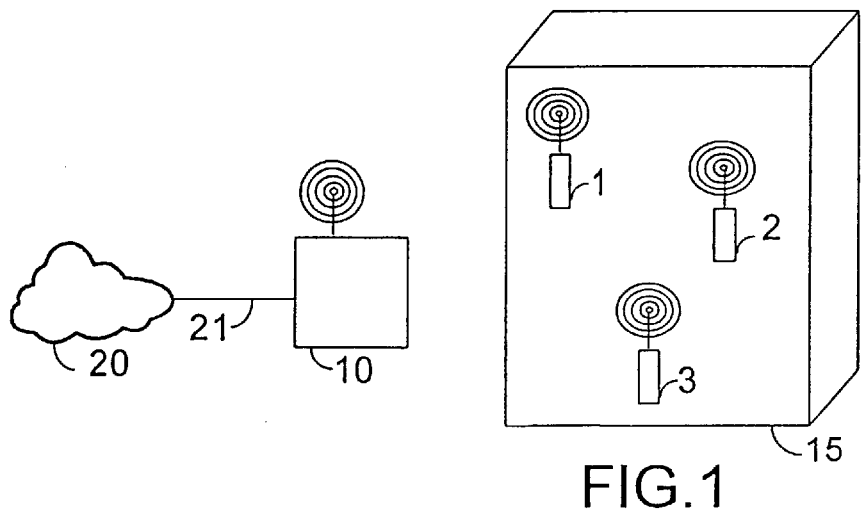
FIG.1
| Octet | Bit | 8 | 7 | 6 | 5 | 4 | 3 | 2 | 1 |
|---|---|---|---|---|---|---|---|---|---|
| 1 | | 0 | <<NWK-assigned-identity>> | | | | | | |
| 2 | | L | | | | | | | |
| 3 | | 1 | Type | | | | | | |
| 4 | | 1 | Length-of-id-value | | | | | | |
| 5 | | id-value | | | | | | | |
| ⋮ | | | | | | | | | |
| L+2 | | | | | | | | | |
FIG.2
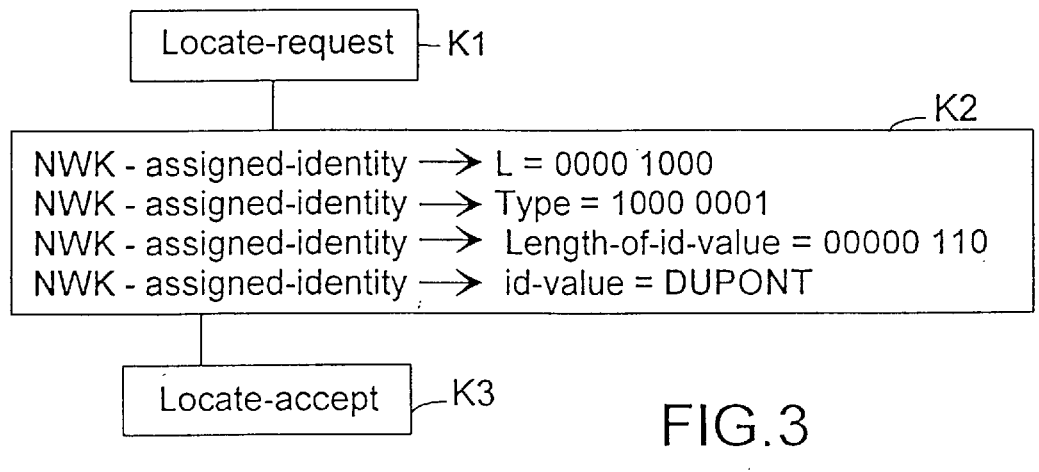
FIG.3

MOBILE TELEPHONE WITH INTERIAL IDENTIFIER IN LOCATION MESSAGES

DESCRIPTION

Field of the Invention

The present invention relates to a telecommunications system comprising at least a radio base station in whose coverage area a plurality of terminals are called to move, said terminals permitting of being identified at the level of said radio base station by an identifier called internal identifier, and location messages being defined for transporting between terminals and radio base station information relating to the location of said terminals.

The invention likewise relates to a mobile telephone terminal which can be identified at the level of a radio base station by an identifier called internal identifier, and of exchanging location messages with said radio base station.

The invention finally relates to an identification method by means of an internal identifier of a mobile terminal at the level of a telecommunications network comprising at least one radio base station, said network utilizing messages called location messages for transporting between terminals and radio base stations information relating to the location of said terminals.

The invention has significant applications notably in the field of mobile telephony. Applied within the scope of the Digital European Cordless Telecommunication (DECT) standard, it permits of, for example, identifying the various users of a private network or a business network in an easy manner.

BACKGROUND OF THE INVENTION

The internal identity of a terminal is used for transmitting internal calls, that is to say, calls within the same network, which do not need the use of public telephone lines. The mobile telephony standards do not provide a specific internal identification mode of the terminals. Each manufacturer is thus to make his own choice, which blocks any interoperability between the equipment manufactured by the various manufacturers.

It is an object of the present invention to propose a common, particularly advantageous mode of internal identification of the terminals.

SUMMARY OF THE INVENTION

Therefore, a telecommunications system according to the invention and as described in the opening paragraph is characterized in that said internal identifier is transmitted in said location messages.

The use of location messages is particularly advantageous, because it permits of transmitting said internal identity:

on the initiative of the radio base station, or the terminal, when it is necessary (that is to say, after a subscription or a location procedure).

The location messages indeed provide the advantage that they can be exchanged between a terminal and a radio base station on the initiative of the terminal or of the radio base station. They are exchanged on the initiative of the radio base station when the latter wishes to update its data bases. They are exchanged on the initiative of the terminal when the latter wishes to reveal itself to a radio base station to which it has right of access (for example, when the terminal comes back to the coverage area of a radio base station to which it has right of access, it declares itself ready to receive calls in the neighbourhood of this radio base station).

Moreover, after the subscription of a terminal in the neighbourhood of a radio base station, a location procedure is systematically used, thus providing the possibility of transmitting the internal identity of the terminal between said radio base station and said terminal (the subscription procedure for a terminal consists of obtaining right of access in the neighbourhood of a radio base station).

When said telecommunications system is in conformity with the standard ETSI 300175-5 from the European Telecommunication Standards Institute (called DECT standard in the following of the description), said internal identity is transmitted in the messages "locate-request" and/or "locate-accept" defined in said standard.

In a particularly advantageous embodiment, said internal identity is then transmitted in the field "NWK-assigned-identity" of said location messages.

Indeed, this field has been defined in the standard for transmitting various identities. In its current state, the standard project provides that it can be used for transmitting the Temporary Mobile Subscriber Identity (TMSI) of a terminal within the meaning of the Global System for Mobile Communication (GSM) standard. Its use for transmitting the internal identity of a terminal thus makes it possible to preserve a certain coherence in the application of the standard.

Finally, said internal identity is advantageously formed by alphanumeric characters which renders its use particularly simple.

BRIEF DESCRIPTION OF THE DRAWINGS

These and other aspects of the invention will be apparent from and elucidated with reference to the embodiments described hereinafter.

In the drawings:

FIG. 1 shows an embodiment of a telecommunications system according to the invention, FIG. 2 represents the format of the field "NWK-assigned-identity" of the location messages "locate-accept" and "locate-request" defined by the DECT standard, and FIG. 3 represents a flow chart of an embodiment of an identification method of a mobile terminal according to the invention.

DESCRIPTION OF PREFERRED EMBODIMENTS

By way of example, the invention applied to the DECT standard will now be described. In the following of the description, reference will be made to the project of the DECT standard in its latest version (which dates back from January 1995). However, the invention can be applied to other mobile telephony standards.

In FIG. 1 is shown an embodiment of a telecommunications system according to the invention. This system comprises a radio base station 10 installed in a building 15. Three terminals 1, 2 and 3 are situated in the coverage area of the radio base station 10. The radio base station 10 is connected to the public telephone network 20 by a cable 21.

Other examples of telecommunications systems are described, for example, in the article "The complete solution for cordless access" by Frank Owen published in the journal "Philips Telecommunications Review", Vol. 52, no. 3, January 1995.

The location messages defined in the DECT standard are called "locate-request" and "locate-accept". They are transmitted between the terminal and the radio base station during location procedures defined by the standard, notably during "location registration" and "location update" procedures. The location procedures are described in paragraph 13.4 of the project of the standard cited above; and the formats of the "locate-accept" and "locate-request" messages are described in the paragraph 6.3.6.17 and 6.3.6.19, respectively.

The procedure of "location registration" makes it possible for a terminal to reveal itself to a radio base station to which it has right of access. Therefore, the terminal sends a "locate-request" message to the radio base station. And the radio base station responds to the terminal by sending a "locate-accept" or "locate-reject" message thereto.

The "location update" procedure makes it possible for a radio base station to oblige a terminal to send a "locate-request" message thereto for updating the terminal's databases. According to this procedure, the radio base station sends to the terminal a message called "MM-Info-Suggest" whose "Info-type" field contains the message "locate-suggest". Upon reception of such a message, the terminal initiates a "location registration" procedure.

According to the invention, the field "NWK-assigned-identity" of the messages "locate-accept" and "locate-request" is used for transporting the internal identity of the terminals. The length of this field is defined between 5 and 20 octets. Its structure, which is defined in the standard project in paragraph 7.7.28, is recalled in FIG. 2.

The first octet is reserved for identifying the respective field (NWK-assigned-identity in this case, where NWK refers to network). The second octet makes it possible to code the length L of the field. The third octet indicates the type of field. The standard project in its current state notably provides that the value "1110100" (for bits 1 to 7) is used for indicating that the field contains the identity TMSI (Temporary Mobile Subscriber Identity) of a terminal within the meaning of the GSM standard.

According to the invention, a value is reserved for indicating that this field contains the internal identity of a terminal. By way of example, the value "0000001" is thereto reserved for bits 1 to 7 of the third octet.

The fourth octet indicates the length of the identity contained in the field "NWK-assigned-identity". And the octets 5 to L+2 contain the value of the identity.

According to the invention, the internal identity of a terminal is formed by a string of alphanumeric characters. The length of this identity (indicated by the fourth octet) thus expresses a number of octets. And the actual identity (octets 5 to L+2) is coded with the 8-bits characters defined in the annex D of the standard project.

By way of example and with reference to FIG. 3 there will now be described an embodiment of a mobile terminal identification method according to the invention. According to this method, the internal identity of a terminal is assigned by the radio base station in response to a "locate-request" message. In FIG. 3, a "locate-request" message is received by the radio base station in box K1. In box K2 the field NWK-assigned-identity of the response message "locate-accept" is updated:

NWK-assigned-identity→L=0000 1000
NWK-assigned-identity→type=1000 0001
NWK-assigned-identity→length-of-ID-value=0000 0110
NWK-assigned-identity→id-value=DUPONT (six characters coded in 8 bits each, according to annex D of the DECT standard project). Then in box K3 the message "locate-accept" is sent to the terminal.

Obviously, other terminal identification methods can be used, notably a method according to which the identifier would be chosen by the terminal and transmitted in "locate-request" messages.

The invention is not restricted to embodiments which have just been described. It is notably applicable to other mobile telephony standards than the DECT standard.

I claim:

1. A telecommunications system comprising:

a base station; and a mobile terminal having an internal identifier;

wherein location messages are exchanged between said base station and said mobile terminal to provide location of said mobile terminal to said base station, said location messages including a locate request message transmitted from said mobile terminal to said base station and a locate accept message transmitted from said base station to said mobile terminal, said internal identifier being transported by said locate request message and said locate accept message, and wherein said location messages include a value that indicates whether said location messages include said internal identifier.

2. The telecommunications system of claim 1, wherein said locate request message and said locate accept message are in accordance with a European Telecommunication Standards Institute standard 300175-5.

3. The telecommunications system of claim 1, wherein said internal identifier is in a network-assigned-identity field of said locate request message, and said locate accept message in accordance with a European Telecommunication Standards Institute standard 300175-5.

4. The telecommunications system of claim 1, wherein said internal identifier includes a string of alphanumeric characters.

5. A mobile telephone terminal comprising:

an internal identifier; and means for exchanging location messages between a base station and said mobile terminal to provide location of said mobile terminal to said base station, said location messages including a locate request message transmitted from said mobile terminal to said base station and a locate accept message transmitted from said base station to said mobile terminal, said internal identifier being transported by said locate request message and said locate accept message, and wherein location messages include a value that indicates whether said location messages include said internal identifier.

6. The mobile telephone terminal of claim 5, wherein said locate request message and said locate accept message are in accordance with a European Telecommunication Standards Institute standard 300175-5.

7. The mobile telephone terminal of claim 5, wherein said internal identifier is in a network-assigned-identity field of said locate request message, and said locate accept message in accordance with a European Telecommunication Standards Institute standard 300175-5.

8. The mobile telephone terminal of claim 5, wherein said internal identifier includes a string of alphanumeric characters.

9. A method for identifying a mobile terminal having an internal identifier comprising:

exchanging location messages between a base station and said mobile terminal to provide location of said mobile terminal to said base station, said location messages including a locate request message transmitted from said mobile terminal to said base station and a locate accept message transmitted from said base station to said mobile terminal;

transporting said internal identifier by said locate request message and said locate accept message; and including in said location messages a value that indicates whether said location messages include said internal identifier.

10. The method of claim 9, wherein said locate request message and said locate accept message are in accordance with a European Telecommunication Standards Institute standard 300175-5.

11. The method of claim 9, further comprising including said internal identifier in a network-assigned-identity field of said locate request message and said locate accept message in accordance with a European Telecommunication Standards Institute standard 300175-5.

12. The method of claim 9, further comprising including a string of alphanumeric characters in said internal identifier.

* * * * *